(12) United States Patent  
George et al.

(10) Patent No.: US 7,854,588 B2
(45) Date of Patent: Dec. 21, 2010

(54) STAMPED TORQUE CONVERTER STATOR BLADES AND A TORQUE CONVERTER STATOR WITH STAMPED BLADES

(75) Inventors: Philip George, Wooster, OH (US); Steven Olsen, Wooster, OH (US); Nigel Gurney, Wooster, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 676 days.

(21) Appl. No.: 11/637,324

(22) Filed: Dec. 12, 2006

(65) Prior Publication Data

US 2007/0140841 A1    Jun. 21, 2007

Related U.S. Application Data

(60) Provisional application No. 60/752,192, filed on Dec. 20, 2005.

(51) Int. Cl.
*F04D 29/54* (2006.01)

(52) U.S. Cl. .............. 415/189; 60/361; 415/209.4; 416/214 A; 416/DIG. 3

(58) Field of Classification Search .......... 415/180, 415/189, 191, 209.3, 209.4, 210.1; 416/DIG. 3, 416/214 A, 214 R, 222; 60/361, 365, 367
See application file for complete search history.

(56) References Cited

U.S. PATENT DOCUMENTS

| | | | | |
|---|---|---|---|---|
| 1,415,266 A | * | 5/1922 | Rice | 416/217 |
| 1,470,500 A | * | 10/1923 | Steenstrup | 416/213 R |
| 2,199,243 A | * | 4/1940 | Mortimer | 416/217 |
| 2,336,231 A | | 12/1943 | Dodge | |
| 2,631,004 A | * | 3/1953 | Swansen | 416/217 |
| 2,917,001 A | * | 12/1959 | Zeidler et al. | 416/180 |
| 3,192,862 A | | 7/1965 | Schrader et al. | |
| 3,572,034 A | | 3/1971 | Fisher | |
| 6,805,532 B2 | | 10/2004 | Jaunasse | |
| 6,807,808 B2 | * | 10/2004 | Okada et al. | 60/361 |
| 7,014,426 B2 | * | 3/2006 | Schultz | 416/180 |

FOREIGN PATENT DOCUMENTS

| | | |
|---|---|---|
| DE | 198 47 372 | 4/1999 |
| FR | 2 830 917 | 4/2003 |
| GB | 706752 | 6/1952 |
| WO | WO2004/057214 | 7/2004 |

* cited by examiner

*Primary Examiner*—Edward Look
*Assistant Examiner*—Ryan H Ellis
(74) *Attorney, Agent, or Firm*—Simpson & Simpson, PLLC

(57) ABSTRACT

The present invention broadly comprises a blade for a torque converter stator including a body, a first end, and a second end; a stator blade assembly; and a stator for a torque converter including a plurality of blades, a housing, and a core ring. The first end is arranged to engage the housing and the second end is arranged to engage the core ring. In some aspects, the blade is stamped or the body is arcuate. The assembly includes a plurality of separate blades. In some aspects, each blade is stamped or bodies for adjacent blades at least partially overlap with respect to a radial plane through an axis for the stator. In some aspects, an axial opening between blades widens radially outward or inward.

32 Claims, 9 Drawing Sheets

STAMPED TORQUE CONVERTER STATOR BLADES AND A TORQUE CONVERTER STATOR WITH STAMPED BLADES

CROSS-REFERENCE TO RELATED APPLICATIONS

This application claims the benefit under 35 U.S.C. §119 (e) of U.S. Provisional Application No. 60/752,192, filed Dec. 20, 2005.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a stamped blade for a torque converter stator. The invention also relates to torque converter stator with an assembly of discrete blades, specifically, stamped blades.

BACKGROUND OF THE INVENTION

FIG. 1 is a perspective view of prior art stator 1 for a torque converter. It is known to fabricate a stator for a torque converter using casting of metals, such as aluminum, or molding of materials such as phenolic resin. In particular, these techniques are used to form blades 2 for a stator as a single unit. Typically, stator blades 2, core ring 3, and portions of stator body 4 are formed as a single unit or piece. Unfortunately, casting can be a relatively costly process. Also, cast stators typically require additional machining to accept other components, such as a one-way clutch, side plates, or a snap ring. Typically, dies used to fabricate stators are of a radial pull configuration or an axial pull configuration. Due to cost considerations, the axial pull configuration is more commonly used. For example, for radial pull stators, the core ring cannot be included in the cast or mold. Therefore, a separate core ring, typically steel, must be wrapped around the stator outside diameter and welded into place.

Improved hydrodynamic performance can be achieved by various configurations of the blades in a stator. For example, the shape of the blades in the stator influences the efficiency with which the stator transfers fluid from the turbine to the pump. In many cases, the blades must significantly redirect the flow. The inlet angle of the blades measures the orientation of the nose of the blade (the end of the blade on the turbine side of the stator). The efficiency of the fluid transfer in the stator is a function of the alignment of the inlet angle with the direction of fluid flow from the turbine. That is, the closer the alignment, the better the efficiency. Unfortunately, the use of dies limits the configurations possible among the blades formed by the die. Specifically, the blades and other components formed in the die must be shaped and aligned so that at all points, the surface features of the die have an unrestricted removal path. For example, for an axial pull configuration, the die is pulled away in axial directions 5 and 6. Therefore, there can be no undercutting or overlapping of the blades and components that would interfere with removal of the die in directions 5 and 6. For example, the blades cannot circumferentially overlap. That is, an axial plane (not shown) passing through axis 7 cannot intersect adjacent blades. Regarding the inlet angle noted above, an optimal inlet angle for applications requiring increased torque ratio typically requires that the nose of the blade be significantly curved with respect to the remainder of the blade body. Unfortunately, such curvature creates overlaps that are untenable for an axial pull die. Therefore, for an axial pull die, the nose of the blades must be undesirably "flattened" to avoid axial overlaps, undesirably limiting the inlet angle possible for the blades. Due to inherent constraints in the casting process, cast blades must be made with a minimum thickness. Unfortunately, this minimum thickness is sometimes detrimental to the performance of the stator.

Thus, there is a long-felt need for a stator with blades configured for improved hydrodynamic performance. There also is a long-felt need for a stator that can be fabricated using processes that are simpler and more cost-effective, and materials that are more inexpensive than are associated with casting and molding operations.

BRIEF SUMMARY OF THE INVENTION

The present invention broadly comprises a blade for a torque converter stator including a body, a first end, and a second end. The first end is arranged to engage a housing or body for the stator and the second end is arranged to engage a core ring for the stator. In some aspects, the blade is stamped or the first and second ends are integral to the body. In some aspects, the first end includes a first segment and at least one second segment, the first segment is disposed at a first angle with respect to the body, and the at least one second segment is disposed at a second angle with respect to the first segment. In some aspects, the body is arcuate or has a uniform thickness. In some aspects, the second end includes at least one third segment disposed at a third angle with respect to the body and the at least one third segment includes a tab disposed at a fourth angle with respect to the at least one third segment. In some aspects, the body is tapered with respect to the first and second ends, in particular, from the second end to the first end.

The present invention also broadly comprises a stator blade assembly for a torque converter stator including a plurality of separate blades. Each blade is a separate piece and has a body, a first end, and a second end. The first end is configured to engage a housing for the stator and the second end is configured to engage a core ring for the stator. In some aspects, each blade is stamped. In some aspects, bodies for adjacent blades at least partially overlap with respect to an axial plane through an axis for the stator. In some aspects, an axial opening is formed between the first and second blades and the first opening widens radially outward or inward. In some aspects, opposing surfaces for adjacent blades are substantially parallel.

The present invention further broadly comprises a stator for a torque converter including a plurality of blades, a housing for the stator, and a core ring. Each blade is a separate piece and includes a first end connected to the housing for the stator and a second end connected to the core ring. In some aspects, the blades are stamped. The core ring includes an inner radial surface and the second end includes a blade outer radial surface in contact with the inner radial surface. In some aspects, the blade outer radial surface is configured to strengthen the stator ring. In some aspects, the core ring includes at least one opening and an outer radial surface, at least one second end includes a tab, the tab passes through a respective opening, and the tab is folded to contact the outer radial surface. In some aspects, the core ring is a stamped, rectangular plate with first and second ends overlapped and secured one to the other. In some aspects, the core includes an outer circumferential surface and first and second axial surfaces and the first end is in contact with the outer circumferential surface and the first and second axial surfaces. In some aspects, the stator includes first and second side plates press fitted over at least a portion of the first end and the first and second axial surface. In some aspects, the first and second side plates are stamped. In some aspects, the core includes a one-way clutch and a race for the clutch, the first and second plates retain the plurality of stamped blades and the clutch, and the race is centered by the first and second plates.

The present invention also broadly comprises respective methods for forming a blade for a torque converter stator and for forming a stator blade assembly for a torque converter stator.

It is a general object of the present invention to provide a blade for a stator that can be produced in a more cost-effective manner, in particular, a blade that can be produced by a stamping process.

It is another general object of the present invention to provide a blade assembly for a torque converter stator that includes blade configurations such as overlaps, undercuts, spaces between blades, and inlet angles not possible using casting or molding techniques.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 17A:
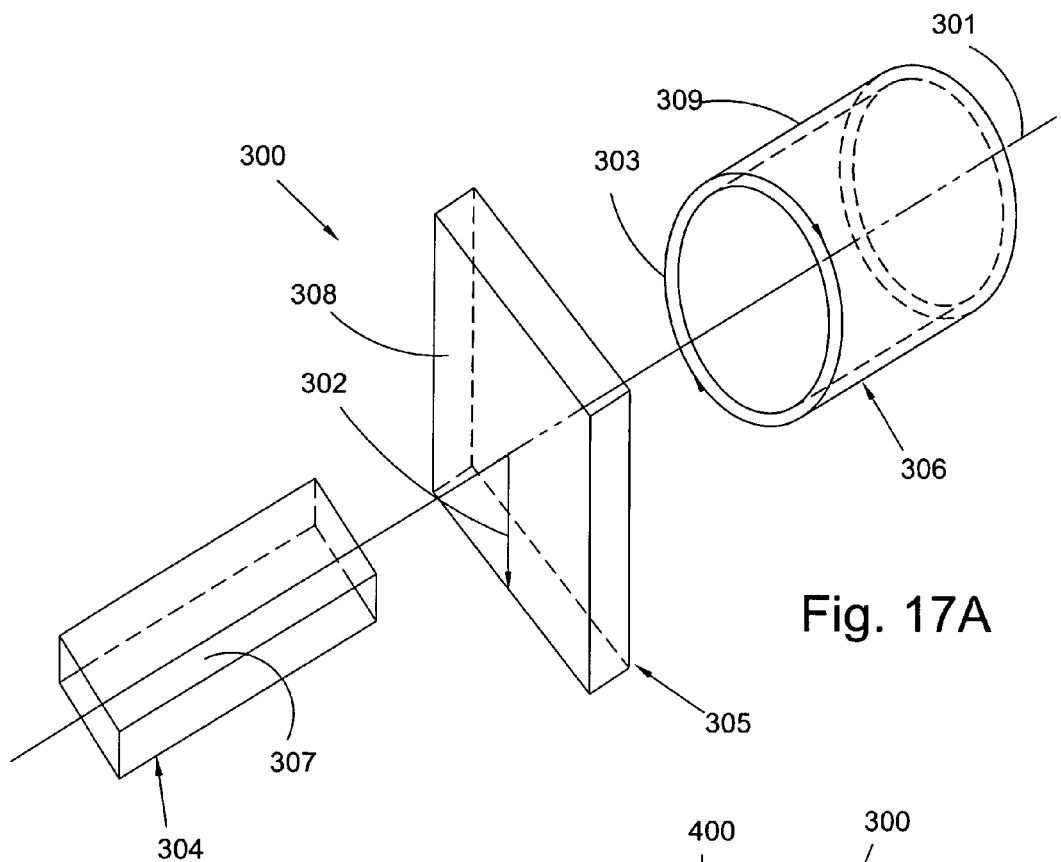
FIG. 17A is a perspective view of a cylindrical coordinate system demonstrating spatial terminology used in the present application; and, FIG. 17B is a perspective view of an object in the cylindrical coordinate system of FIG. 17A demonstrating spatial terminology used in the present application.

FIG. 17A is a perspective view of cylindrical coordinate system 300 demonstrating spatial terminology used in the present application. The present invention is at least partially described within the context of a cylindrical coordinate system. System 300 has a longitudinal axis 301, used as the reference for the directional and spatial terms that follow. The adjectives "axial," "radial," and "circumferential" are with respect to an orientation parallel to axis 301, radius 302 (which is orthogonal to axis 301), and circumference 303, respectively. The adjectives "axial," "radial" and "circumferential" also are regarding orientation parallel to respective planes. To clarify the disposition of the various planes, objects 304, 305, and 306 are used. Surface 307 of object 304 forms an axial plane. That is, axis 301 forms a line along the surface. Surface 308 of object 305 forms a radial plane. That is, radius 302 forms a line along the surface. Surface 309 of object 306 forms a circumferential plane. That is, circumference 303 forms a line along the surface. As a further example, axial movement or disposition is parallel to axis 301, radial movement or disposition is parallel to radius 302, and circumferential movement or disposition is parallel to circumference 303. Rotation is with respect to axis 301.

The adverbs "axially," "radially," and "circumferentially" are with respect to an orientation parallel to axis 301, radius 302, or circumference 303, respectively. The adverbs "axially," "radially," and "circumferentially" also are regarding orientation parallel to respective planes.

Figure 17B:
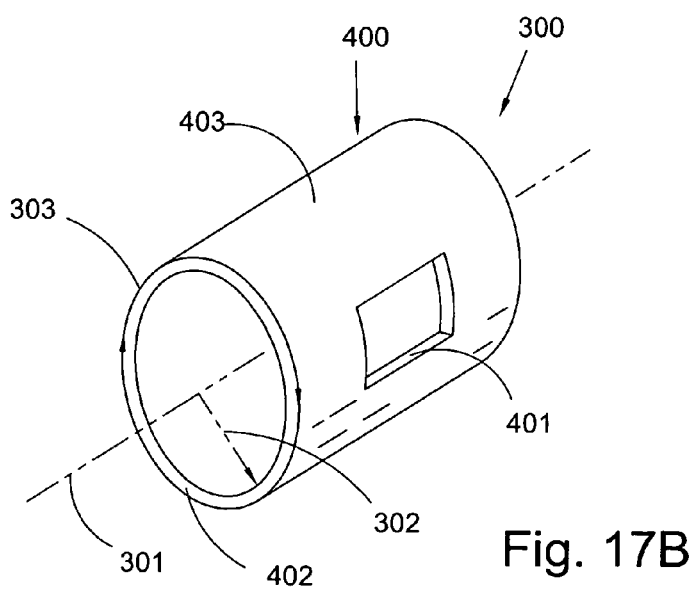

FIG. 17B is a perspective view of object 400 in cylindrical coordinate system 300 of FIG. 17A demonstrating spatial terminology used in the present application. Cylindrical object 400 is representative of a cylindrical object in a cylindrical coordinate system and is not intended to limit the present invention is any manner. Object 400 includes axial surface 401, radial surface 402, and circumferential surface 403. Surface 401 is part of an axial plane, surface 402 is part of a radial plane, and surface 403 is part of a circumferential plane.

Figure 1:
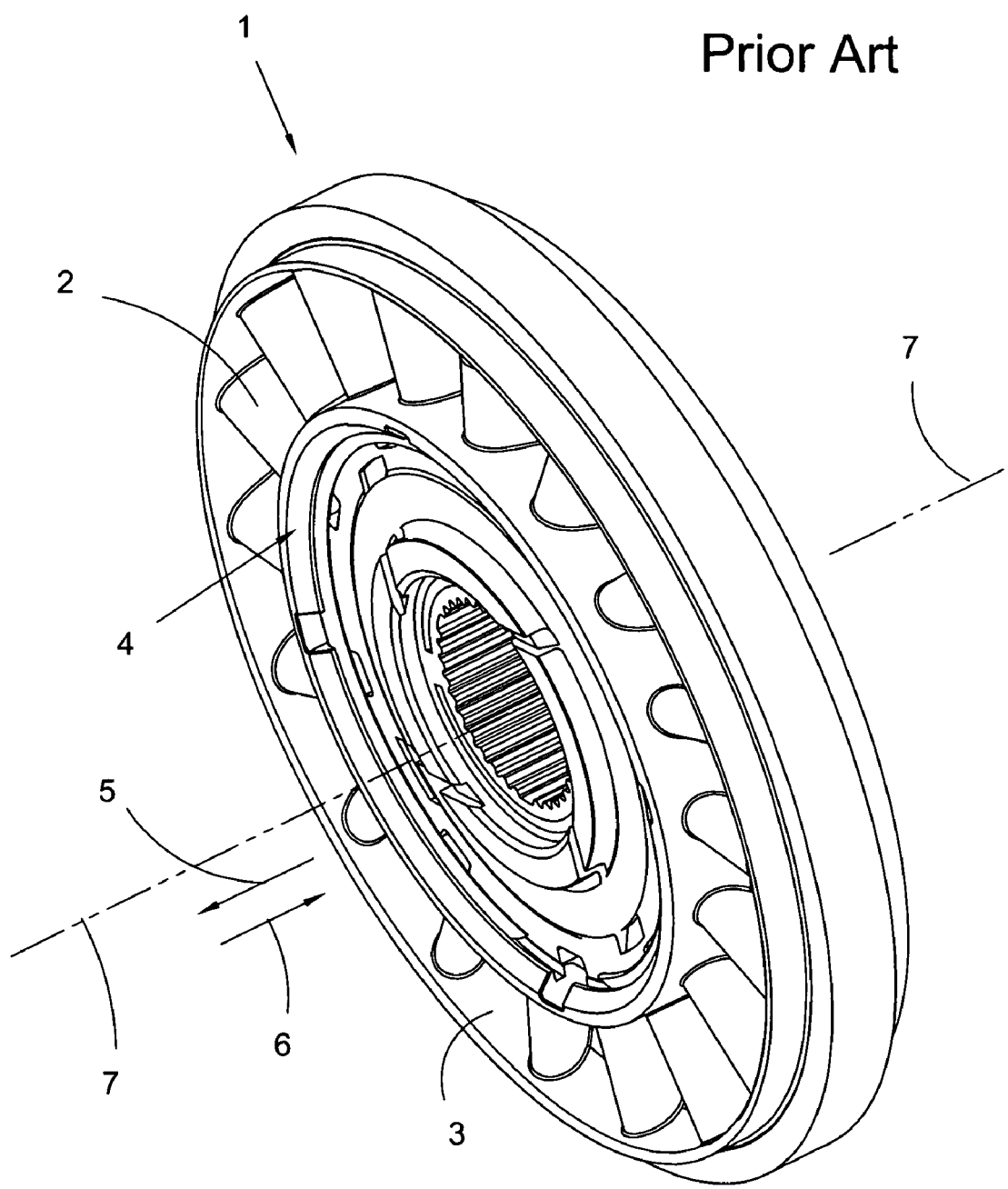
FIG. 1 is a perspective view of a prior art stator for a torque converter.
Figure 2:
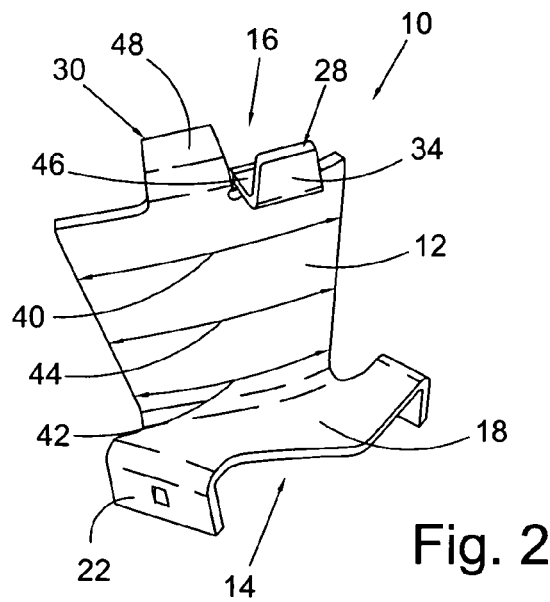
FIG. 2 is a perspective front view of a present invention stator blade.

FIG. 2 is a perspective front view of present invention stator blade 10. Blade 10 is a blade for a torque converter stator (not shown) and includes body 12 with ends 14 and 16. End 14 is arranged, formed, or configured to engage a housing for the stator. End 16 is arranged, formed, or configured to engage a core ring for the stator. Ends 14 and 16 are integral to body 12. However, in some aspects, one or both of the ends can be separate from the body and affixed to the body by any means known in the art. Ends 14 and 16 also are referred to as a housing connection segment and a core ring connection segment, respectively.

Figure 3:
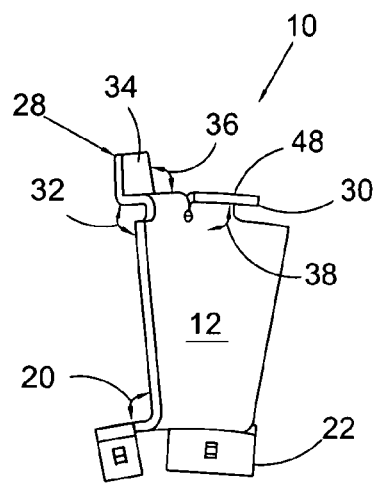
FIGS. 3 and 4 are perspective back views of the stator blade shown in FIG. 2.
Figure 4:
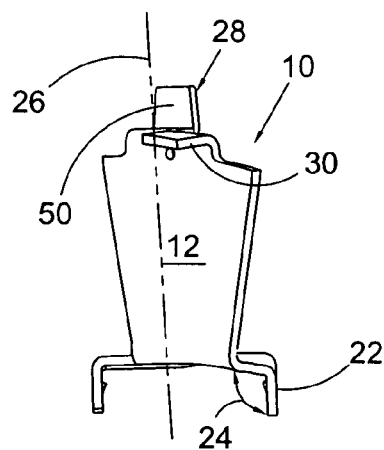

FIGS. 3 and 4 are perspective back views of stator blade 10 shown in FIG. 2.

Figure 5:
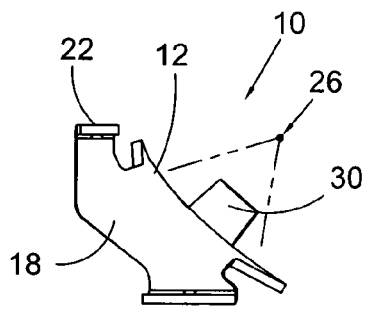
FIG. 5 is a bottom view of the stator blade shown in FIG. 2.

FIG. 5 is a bottom view of stator blade 10 shown in FIG. 2.

Figure 6:
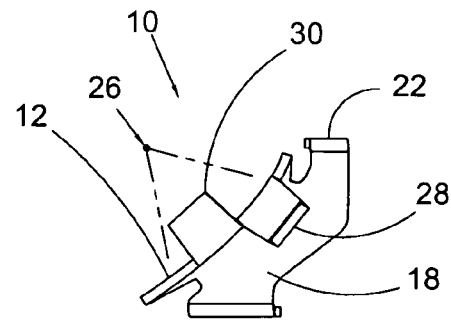
FIG. 6 is a top view of the stator blade shown in FIG. 2.

FIG. 6 is a top view of stator blade 10 shown in FIG. 2. The following should be viewed in light of FIGS. 1-6. To accomplish the engagement with the housing for the stator, end 14 includes segment 18 disposed or formed at angle 20 with respect to the body. Angle 20 is not limited to any particular value. In some aspects, angle 20 is approximately ninety degrees. As described infra, segment 18 engages an outer circumference for a housing for the stator. In some aspects, end 14 also includes at least one segment 22 disposed or formed at angle 24 with respect to segment 18. Angle 24 is not limited to any particular value. In some aspects, angle 24 is approximately ninety degrees. It should be understood that blade 10 is not limited to the configuration, shape, orientation, size, or ratio of body and segments shown in FIGS. 1-6 and that other configurations, shapes, orientations, sizes, and ratios are included in the spirit and scope of the invention as claimed.

In some aspects, blade 10 is arcuate or curved, in particular, body 12. In some aspects body 12 is arcuate with respect to axis 26 between the ends 14 and 16. This curvature is particularly apparent in FIGS. 5 and 6. Blade 10 is not limited to any particular degree of curvature. The curvature can be uniform or can vary across the body. It should be understood that blade 10 also can be arcuate with respect to an orientation orthogonal to axis 26.

In some aspects, end 16 includes segments 28 and 30. As further described infra, these segments are used to engage the blade with a stator ring and to stabilize the ring. In some aspects, segment 28 is disposed, or formed, at angle 32 with respect to the body. In some aspects, angle 32 is approximately ninety degrees. In some aspects, segment 28 includes tab 34 disposed, or formed, at angle 36 with respect segment 28. In some aspects, angle 36 is approximately ninety degrees. As further described infra, tab 34 is used to secure the blade to the stator ring. In some aspects, segment 30 is disposed, or formed, at angle 38 with respect to the body. In some aspects, angle 38 is approximately ninety degrees.

In some aspects, blade 10 is tapered with respect to ends 14 and 16. For example, in the figures, body 12 tapers from end 16 to end 14. That is, width 40 is greater than width 42. It should be understood that blade 10 also can be formed to taper from end 14 to end 16. Further, it should be understood that blade 10 can be formed with any combinations of tapers or shapes. For example (not shown), widths 40 and 42 could be less than width 44 or width 44 could be less than widths 40 and 42. In general, blade 10 is not limited to any particular combination, shape, or ratio of tapers.

In some aspects, and as shown in the figures, blade 10 is formed by stamping. For example, the blade is formed by stamping a sheet of metal. It should be understood that blade 10 can be formed by any stamping process known in the art and that a stamped blade 10 can be formed of any material known in the art, including, but not limited to, steel or aluminum. In some aspects (not shown), blade 10 is formed by casting metals, molding plastics, or forming powdered metals.

Figure 7:
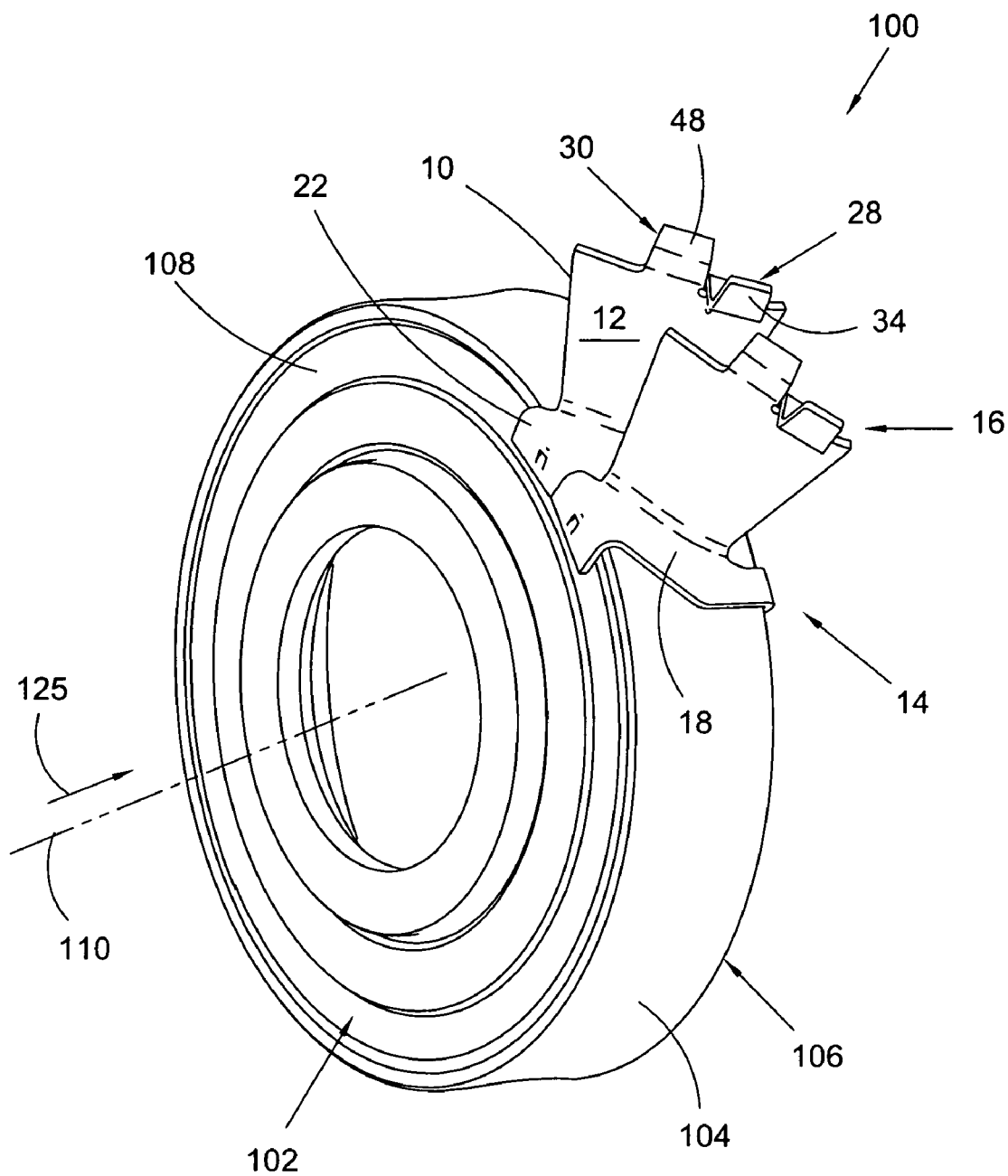
FIG. 7 is a perspective view of a partial present invention stator blade assembly.

FIG. 7 is a perspective view of partial present invention stator blade assembly 100. The following should be viewed in light of FIGS. 1 through 7. Assembly 100 is formed from a plurality of blades 10. To simplify the presentation, only two blades 10 are shown. However, it should be understood that assembly 100 is not limited to any particular number of blades. The discussion regarding blade 10 in the description for FIGS. 1 through 6 is applicable to blades 10 in FIG. 7.

Thus, each blade in the plurality of blades includes body 12 and ends 14 and 16. End 14 is engaged with stator housing 102 and end 16 is configured to engage a core ring (not shown) for the stator. In FIG. 7, each blade in the assembly is a discrete component, that is, a separate piece, and the individual blades in concert form the assembly. However, it should be understood that in some aspects (not shown), two or more blades can be formed in a single component. That is, a single piece may contain more than one blade.

Segments 18 engage, or are in contact with, surface 104 defined by outer circumference 106 of stator housing 102. Segments 22 engage, or are in contact with, radial surface 108 and another radial surface (not visible in FIG. 7) on the opposite side of stator housing 102.

Figure 8:
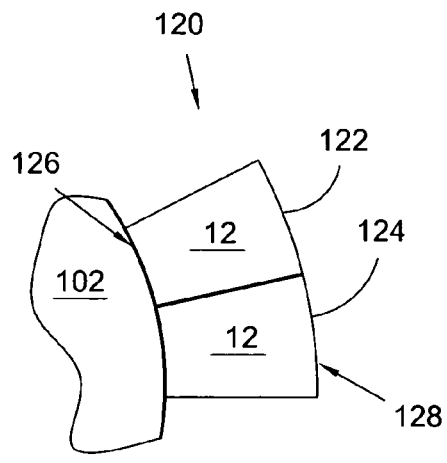
FIGS. 8 through 10 are front views of adjacent stator blades according to a present invention stator blade assembly, illustrating respective overlapping of the blades.
Figure 9:
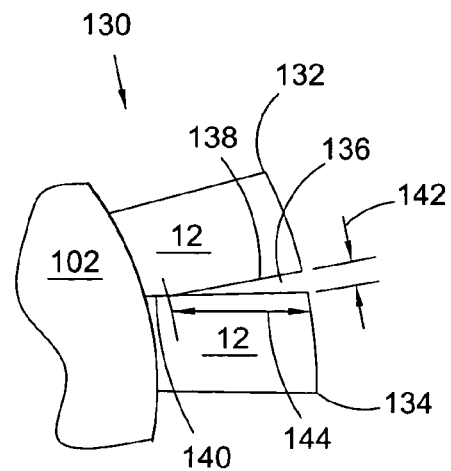
Figure 10:
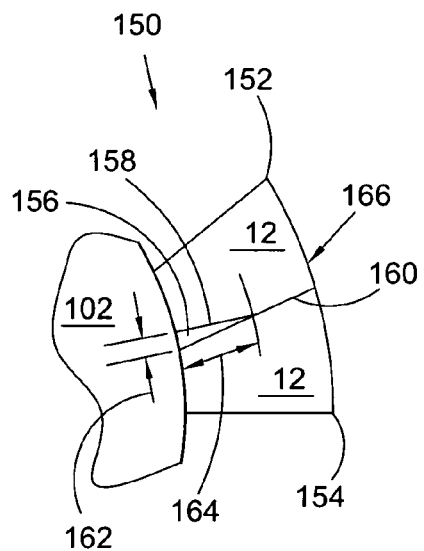

FIGS. 8 through 10 are front views of adjacent stator blades 10 according to present invention stator blade assembly 100, illustrating respective overlapping of blades 10.

Figure 11:
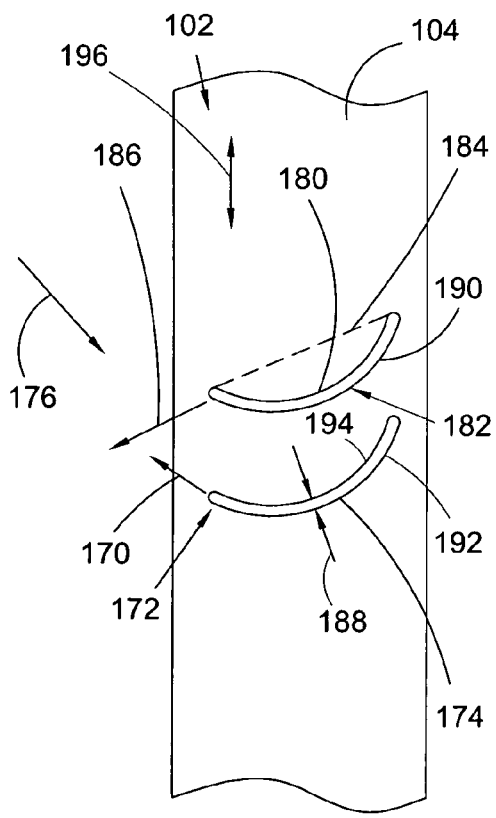
FIG. 11 is a top view of adjacent stator blades according to a present invention stator blade assembly, illustrating blade angles.

FIG. 11 is a top view of adjacent stator blades 10 according to present invention stator blade assembly 100, illustrating blade angles. The following should be viewed in light of FIGS. 1 through 11. By adjacent we mean blades circumferentially adjacent in an assembly, such as the blades shown in FIG. 7. The shape of the blades in FIGS. 8 through 11 is simplified to facilitate the discussion regarding the overlapping. For example, details regarding the ends and segments described supra are omitted. However, it should be understood that the discussion in the description of FIGS. 8 through 11 is applicable to the blades shown in FIG. 7. Individual blades in FIGS. 8 through 11 are given separate reference numbers to clarify the respective descriptions. However, it should be understood that the discussion in the description of FIGS. 1 through 6 is applicable to the blades shown in FIGS. 8 through 11. Stator 102 includes longitudinal axis 110. In the following description, "axial," "radial" and "circumferential" are with respect to axis 110.

Because each blade 10 is a discrete component in some present invention blade assemblies, such assemblies are configurable in ways not possible for monolithic blade assemblies, for example, cast or molded blade assemblies in which two or more blades, if not the entire assembly, are formed from a single piece. The present invention enables the respective bodies of adjacent blades in assembly 100 to at least partially circumferentially overlap with respect to axis 110. Alternately stated, a radial plane (not shown) passing through axis 110 at least partially intersects the respective bodies of the adjacent blades. Such an overlapping configuration is not possible for cast or molded blade assemblies using an axial pull die, as described supra. FIG. 8 shows pair 120 of adjacent blades 122 and 124. For pair 120, there is no visual space between the blades when axially viewed, for example, viewed in direction 125, parallel to axis 110. That is, for the blades in pair 120, respective bodies 12 fully overlap with respect to a radial plane passing through axis 110. That is, the plane passes through ends 14 and 16 for each of blades 122 and 124. Alternately stated, blades 122 and 124 circumferentially overlap from inner circumference 126 to outer circumference 128. It should be understood that assembly 100 is not limited to any particular extent of full overlap for adjacent blades.

FIGS. 9 and 10 show a partial overlap of respective blade bodies with respect to a radial plane passing through the axis. In FIG. 9, pair 130 of adjacent blades 132 and 134 circumferentially overlaps to form space, or opening, 136 between one another. Space 136 opens radially outward with respect to stator core 102. Thus, the respective bodies for blades 132 and 134 overlap at respective ends 14 and edges 138 and 140 diverge radially outward with respect to stator housing 102. Pair 130 is not limited to any particular size or shape of space 136. For example, edges 138 and 140 can overlap at any point with respect to a radial plane and opening 136 is not limited to any particular width 142 or length 144. The partial radial overlap shown in FIG. 9 cannot be formed using an axial pull die, as described supra.

In FIG. 10, pair 150 of adjacent blades 152 and 154 circumferentially overlaps to form space 156 between one another. Space 156 opens radially inward with respect to stator housing 102. Thus, the respective bodies for blades 152 and 154 overlap at respective ends 16 and edges 158 and 160 diverge radially inward with respect to stator housing 102. Pair 150 is not limited to any particular size or shape of space 156. For example, edges 158 and 160 can overlap at any point with respect to a radial plane and opening 156 is not limited to any particular width 162 or length 164. The partial circumferential overlap shown in FIG. 10 cannot be formed using an axial pull die, as described supra. Further, a radial opening closed with respect to outer circumference 166 cannot be formed using a radial pull die. Even if blades 152 and 154 are circumferentially separated so that the respective bodies do not circumferentially overlap (not shown), the blades still cannot be formed using a radial die, due to the radial undercut inherent (width 42 is less than width 40) in this configuration.

The inlet angle for a stator blade is an important factor in determining the efficiency of a torque converter stator, as described supra. The inlet angle is with respect to a tangent of the nose of the blade, that is, the portion of the blade facing the turbine (not shown), for example, tangent 170 from nose 172 of blade 174. Fluid flows from the turbine to the stator in a particular direction, or angle, for example, direction 176. In general, the closer that tangent 170 and direction 176 are to parallel, the more efficiently the stator will operate in transferring fluid from the turbine to the pump (not shown). Alternately stated, it is desirable to configure surface 180 such that the surface acts to cooperate with and smoothly alter the flow of fluid from the turbine, rather than presenting a surface that is more orthogonal to the flow and "fights" the flow. Because present invention blades can be formed in axially overlapping, arcuate shapes, the noses of the blades can be formed to optimize the inlet angle. For example, because of the curvature of nose 172, tangent 170 is nearly parallel to direction 176, helping to optimize the interaction of the fluid from the turbine with the stator blades.

For a cast or molded blade, the extent of curvature is severely restricted by the die withdrawal requirements noted supra, and therefore, the curvature possible for the nose is similarly restricted. For example, for blade 182, surface 180 is formed "facing" the turbine and results in favorable tangent 170. For a cast or molded blade, the surface "facing" the turbine would typically be oriented as shown by surface 184 in order to comply with the requirement to avoid axial overlapping for an axial pull die. Thus, there would be significantly less curvature at the nose and a tangent for the nose would be oriented similar to tangent 186. As can be seen, tangent 186 is nearly orthogonal to direction 176, which would adversely impact the efficiency of a stator using the cast or molded blade.

FIG. 11 also illustrates that blades 10 can be formed with uniform thickness 188. That is, the thickness of the body for a blade can be kept uniform for the entirety of the blade. The uniformity of thickness enables the blade to be shaped in advantageous configurations. For example, in FIG. 11, surface 180 follows the contours of surface 190, resulting in the desired curvature and inlet angle described supra. In contrast, to avoid overlapping, surface 184 would need to diverge from surface 190, creating the undesirable inlet angle noted supra.

Present invention blades can be formed with parallel configurations. For example, blades 174 and 182 have oppositely disposed sides 192 and 194, and 190 and 180, respectively. In FIG. 11, the blades are configured such that sides 194 and 190 are oppositely is disposed (face each other) and are substantially parallel to each other. That is, the distance between the sides with respect to radial planes, for example, planes in direction 196, is consistent. In particular, a present invention assembly can be configured to include blades that are both arcuate and parallel.

Figure 12:
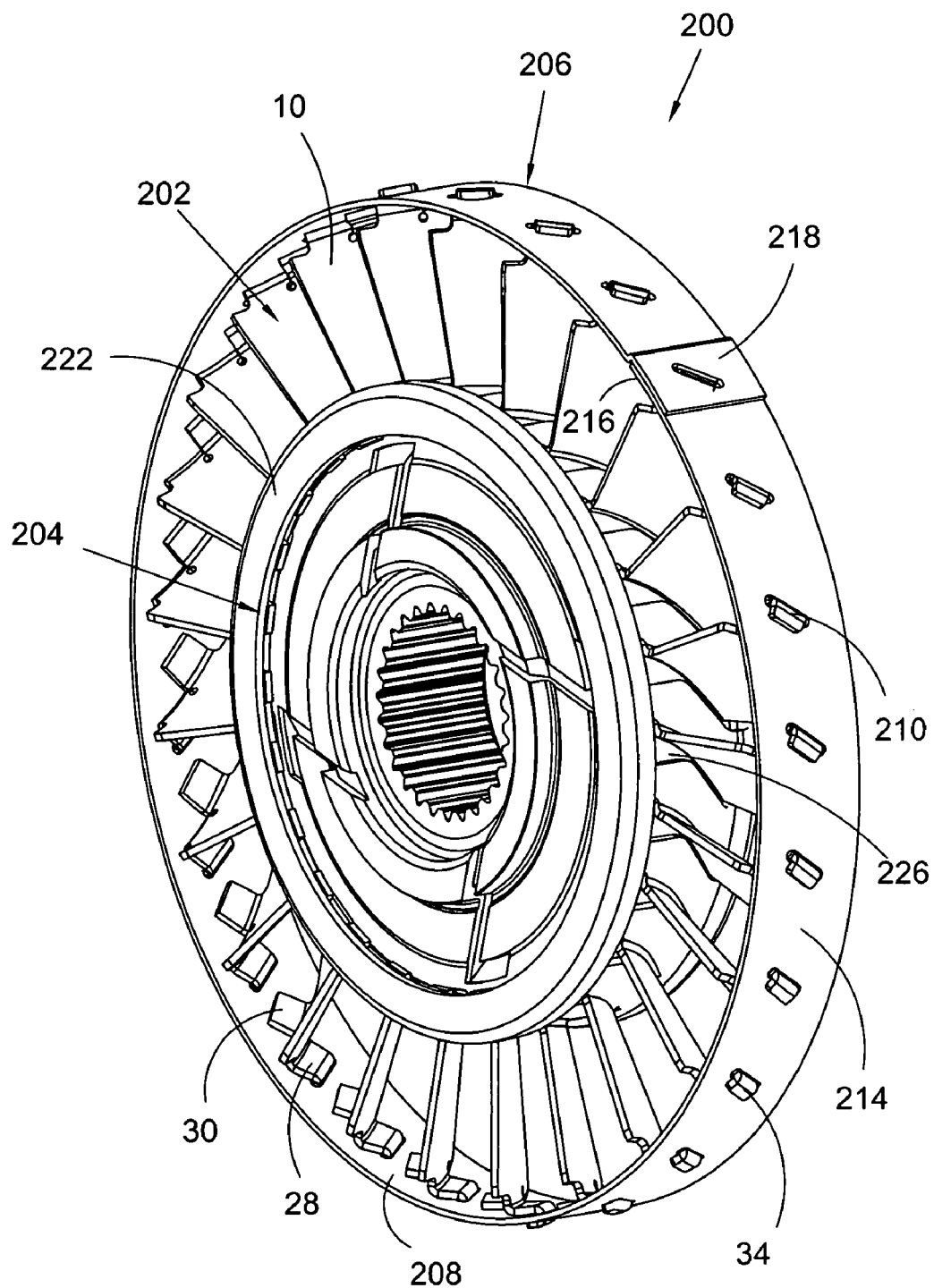
FIG. 12 is a perspective front view of a present invention stator for a torque converter.

FIG. 12 is a perspective front view of present invention stator 200 for a torque converter.

Figure 13:
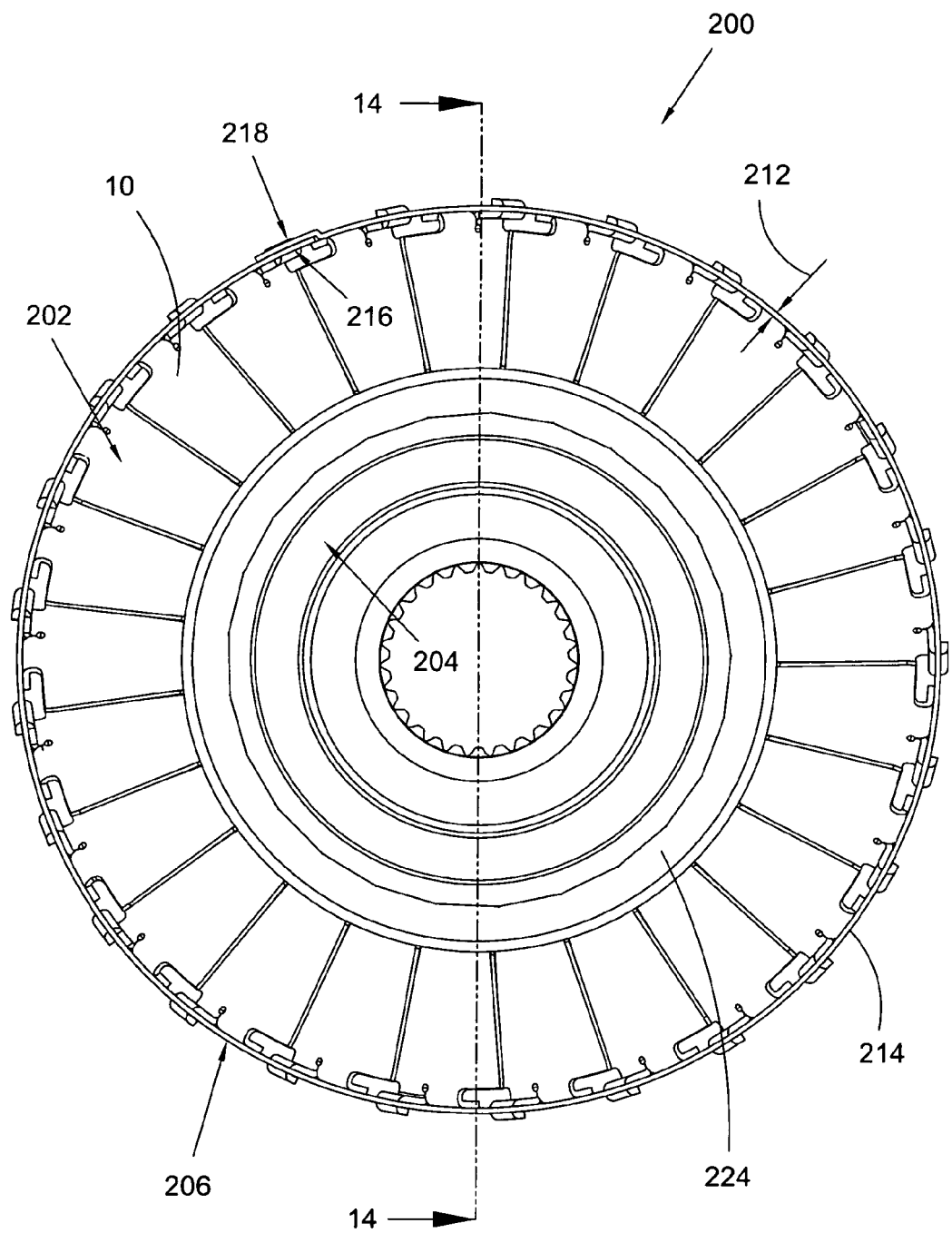
FIG. 13 is a back view of the stator shown in FIG. 12.

FIG. 13 is a back view of stator 200 shown in FIG. 12. The following should be viewed in light of FIGS. 1 through 13. The description for FIG. 7 is applicable to stator 200. Stator 200 includes plurality 202 of stamped blades 10, stator housing 204, and core ring 206. It should be understood that the discussion in the descriptions for FIGS. 8 through 11 applies to plurality 202 (hereinafter referred to as assembly 202). As described supra, for each blade 10, end 14 is connected to stator housing 204 and end 16 is connected to core ring 206. Each blade 10 in assembly 202 is separate from the other blades in the assembly, as described supra. In some aspects (not shown), two or more blades in the assembly are included in a same piece or component as described supra. Core ring 206 includes inner circumferential surface 208 and end 16 is in contact with the inner circumferential surface. In particular, surfaces 46 and 48, shown in FIG. 2, contact surface 208. In some aspects, segment 30 and surface 48 strengthen and stiffen ring 206. In some aspects (not shown), segment 30 is eliminated from blade 10 and ring 206 is strengthened and stiffened by increasing thickness 212. It should be understood that the present invention is not limited to any particular combination of surfaces 48 and thicknesses 212.

In some aspects, core ring 206 also has at least one opening 210 and outer circumferential surface 214. In some aspects, a portion of each end 16, in particular tab 34, passes through a respective opening 210 and is in contact with circumferential surface 214. Specifically, tabs 34 are bent over such that surfaces 50 contact surface 214. Ends 16 and tabs 34 secure assembly 202 to the stator ring. Tabs 34 provide a very simple and cost effective means of securing the assembly and ring. However, it should be understood that other means (not shown) can be used to secure assembly 202 to ring 206. For example, ends 16 could be welded to the ring. In some aspects, core ring 206 is a stamped, rectangular plate with ends 216 and 218. To form ring 206, the plate is rolled into a circular shape and ends 216 and 218 are overlapped and secured one to the other. Any means known in the art can be used to secure the ends.

Figure 14:
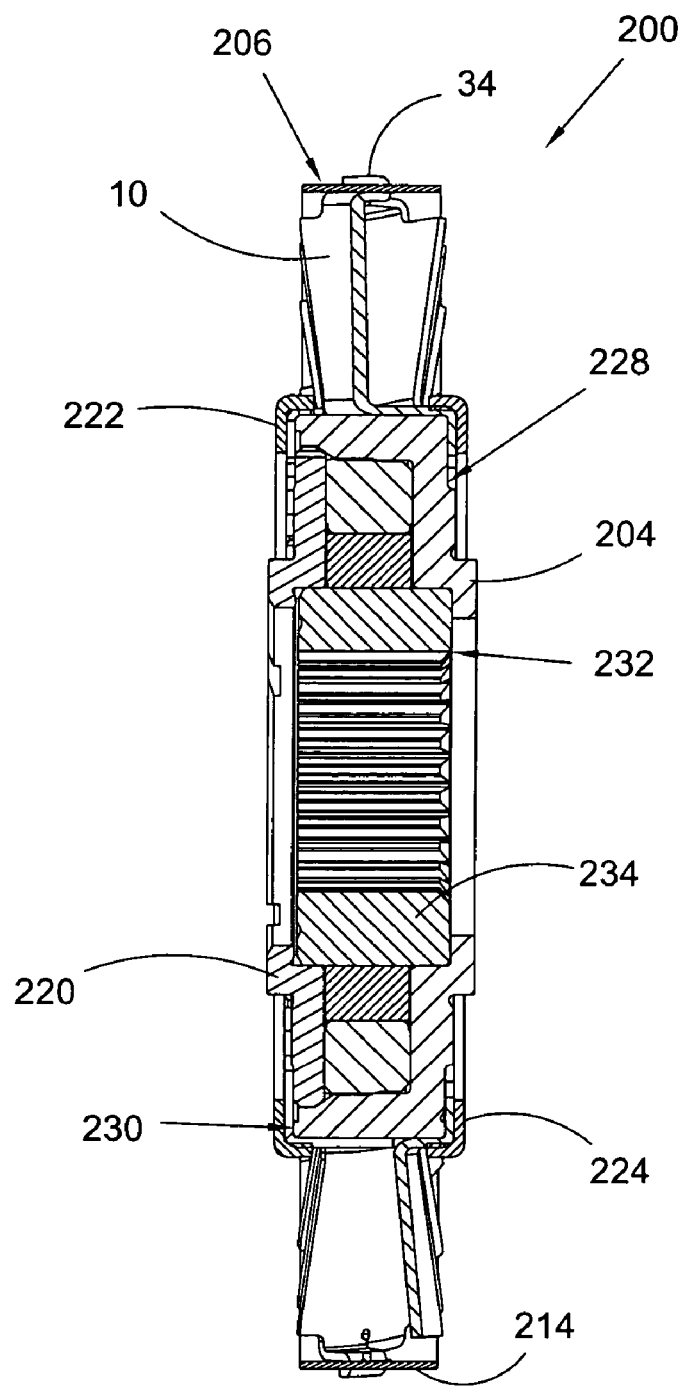
FIG. 14 is a cross-sectional view of the stator shown in FIG. 12 along line 14-14 in FIG. 13.

FIG. 14 is a cross-sectional view of stator 200 shown in FIG. 13 along line 14-14 in FIG. 13.

Figures 15, 16:
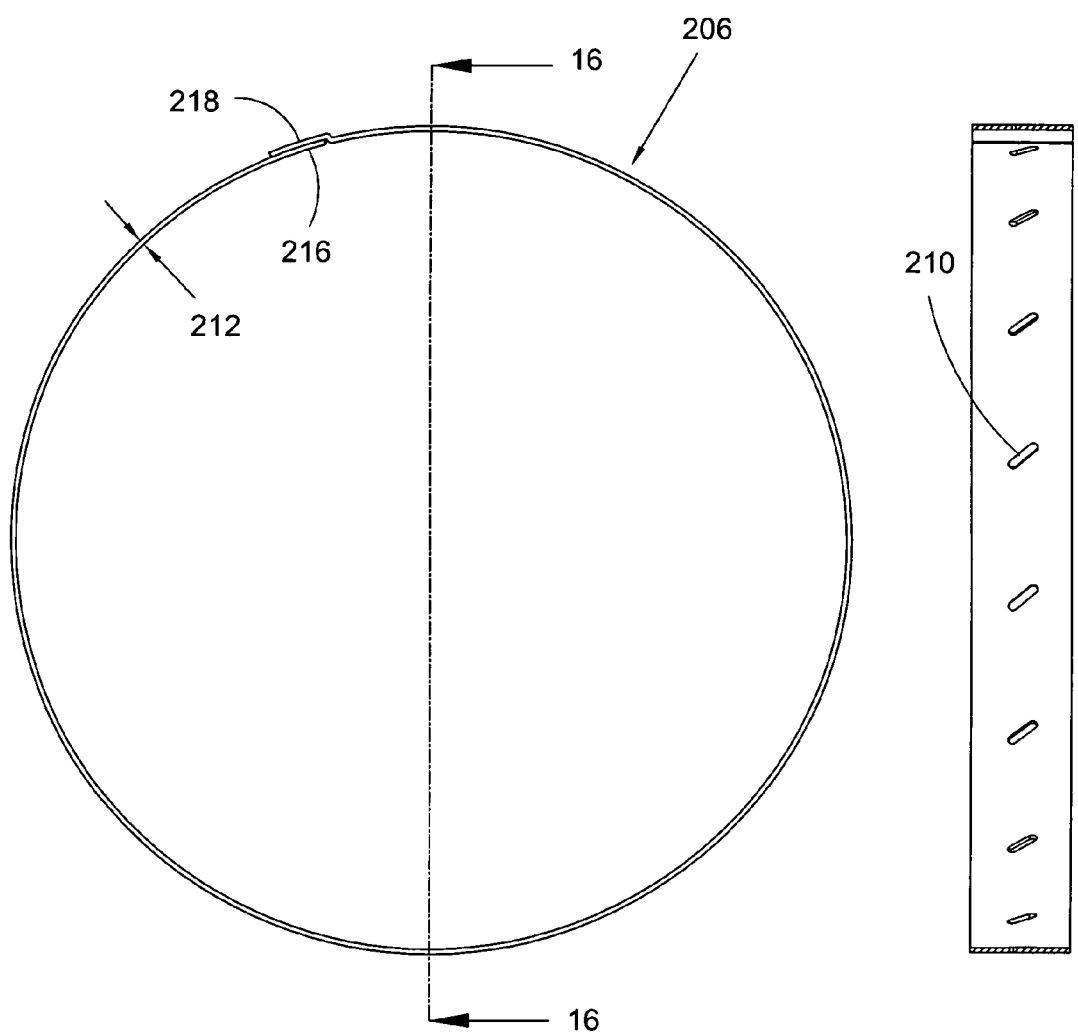
FIG. 15 is a front view of the core ring shown in FIG. 12.
FIG. 16 is a cross-sectional view of the core ring shown in FIG. 15 along line 16-16 in FIG. 15.

FIG. 15 is a front view of core ring 206 shown in FIG. 12.

FIG. 16 is a cross-sectional view of core ring 206 shown in FIG. 15 along line 16-16 in FIG. 15. The following should be viewed in light of FIGS. 1 through 16. Stator 200 includes side plate 220 and retaining rings 222 and 224. In some aspects, plate 220, ring 222, or ring 224 are stamped. However, it should be understood that the plate and rings can be formed using any means known in the art. Stator housing 204 includes outer circumferential surface 226 and radial surfaces 228 and 230. Ends 14 of blades 10 are in contact with surfaces 226, 228, and 230. The description for FIG. 7 is applicable to blades 10 and surfaces 226, 228, and 230. Retaining rings 222 and 224 cover segments 22 of the blades. In some aspects, the rings are press fitted over at least a portion ends 14, specifically segments 22. However, it should be understood that any method known in the art can be used to secure the rings to the stator. In some aspects, stator 200 includes one-way clutch 232 with inner race 234. In some aspects, the side plate and rings 222 and 224 retain the components for the clutch and assembly 202. In some aspects, the side plate and ring 222 center inner race 234. In some aspects (not shown), the side plate and ring 222 are formed from the same piece.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A blade for a torque converter stator, comprising: a body; a first end comprising a first segment extending from said body at a first angle with respect to said body; and, a second end, where said first end is arranged to engage a housing for said stator, said second end is arranged to engage a core ring for said stator and said first and second ends are integral to said body, wherein all of the first segment extends from one side of the body and wherein the body and the first and second ends are formed from a same piece of material.

2. The blade recited in claim 1 wherein said body is arcuate.

3. The blade recited in claim 2 wherein said body further comprises a first thickness and said first thickness is substantially uniform for said body.

4. The blade recited in claim 2 further comprising: an axis between said first and second ends; and, wherein said body is arcuate with respect to said axis.

5. The blade recited in claim 1 wherein said body further comprises a first thickness and said first thickness is substantially uniform for said body.

6. The blade recited in claim 1 wherein said body is tapered with respect to said first and second ends.

7. The blade recited in claim 6 wherein said body is tapered from said second end to said first end.

8. The blade recited in claim 1 wherein said first end further comprises at least one second segment, and said at least one second segment is disposed at a second angle with respect to said first segment.

9. The blade recited in claim 8 wherein said first and second angles are approximately ninety degrees.

10. The blade recited in claim 1 wherein said second end comprises at least one third segment disposed at a third angle with respect to said body.

11. The blade recited in claim 10 wherein said at least one third segment further comprises a tab disposed at a fourth angle with respect to said at least one third segment.

12. The blade recited in claim 11 wherein said third and fourth angles are approximately ninety degrees.

13. The blade recited in claim 1 wherein said blade is stamped.

14. A stator blade assembly for a torque converter stator, comprising: a plurality of blades, where each blade in said plurality of blades is a separate piece, said each blade comprises a body, a first end, and a second end, said first end comprising a first segment extending from said body at a first angle with respect to said body and configured to engage a housing for said stator, and said second end is configured to engage a core ring for said stator, wherein said first and second ends are integral to said body, and wherein all of the first segment extends from one side of the body.

15. The assembly recited in claim 14 wherein said each blade is stamped.

16. The assembly recited in claim 14 wherein said stator comprises a longitudinal axis and said plurality of blades comprises first and second blades, said first and second blades are adjacent one to the other, and respective said bodies for said first and second blades at least partially overlap with respect to a radial plane through said axis.

17. The assembly recited in claim 16 wherein said assembly comprises an inner circumference and an outer circumference and said bodies for said first and second blades overlap from said inner circumference to said outer circumference.

18. The assembly recited in claim 16 further comprising: a first axial opening between said first and second blades, said first opening widening radially outward.

19. The assembly recited in claim 18 wherein said first opening is configured to communicate with said core ring.

20. The assembly recited in claim 16 further comprising: a second axial opening between said first and second blades, said second opening widening radially inward.

21. The assembly recited in claim 20 wherein said second opening is configured to communicate with said stator housing.

22. The assembly recited in claim 14 wherein said plurality of blades comprises third and fourth adjacent blades with respective facing side, wherein respective bodies for said third and fourth blades are arcuate, and wherein said facing sides are substantially parallel.

23. A stator for a torque converter, comprising: a plurality of blades, wherein each blade in said plurality of blades is a separate piece; a housing for a stator; and, a core ring, wherein said each blade further comprises a body, a first end comprising a first segment extending from said body at a first angle with respect to said body and connected to said housing and a second end connected to said core ring, wherein said first and second ends are integral to said body, and wherein all of the first segment extends from one side of the body.

24. The stator recited in claim 23 wherein said each blade is stamped.

25. The stator recited in claim 23 wherein said core ring comprises an inner circumferential surface and said second end further comprises a blade outer circumferential surface in contact with said inner circumferential surface.

26. The stator recited in claim 25 wherein said blade outer circumferential surface is configured to strengthen said stator ring.

27. The stator recited in claim 23 wherein said core ring comprises at least one opening and an outer circumferential surface, at least one second end comprises a tab, said tab passes through a respective said at least one radial opening, and said tab is folded proximate to said outer circumferential surface.

28. The stator recited in claim 23 wherein said core ring is a stamped, rectangular plate with first and second ends overlapped and secured one to the other.

29. The stator recited in claim 23 wherein said stator housing comprises an outer circumferential surface and first and second radial surfaces and wherein said first end is in contact with said outer circumferential surface and said first and second radial surfaces.

30. The stator recited in claim 29 further comprising: first and second retaining rings; and, wherein said first and second rings are press fitted over at least a portion of said first end and said first and second rings are press fitted over said first and second radial surface, respectively.

31. The stator recited in claim 30 wherein said first and second retaining rings are stamped.

32. The stator recited in claim 30 wherein said stator housing further comprises a one-way clutch and a race for said clutch and wherein said first and second rings retain said plurality of blades and said clutch and wherein said race is centered by one of said first or second plates.

* * * * *